United States Patent
Tian et al.

(10) Patent No.: US 8,553,994 B2
(45) Date of Patent: Oct. 8, 2013

(54) COMPRESSIVE SAMPLING FOR MULTIMEDIA CODING

(75) Inventors: Jun Tian, Plainsboro, NJ (US); Dong Cao, Richardson, TX (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 1107 days.

(21) Appl. No.: 12/358,077

(22) Filed: Jan. 22, 2009

(65) Prior Publication Data

US 2009/0196513 A1    Aug. 6, 2009

Related U.S. Application Data

(60) Provisional application No. 61/026,189, filed on Feb. 5, 2008.

(51) Int. Cl.
*G06K 9/36*    (2006.01)
*G06K 9/46*    (2006.01)

(52) U.S. Cl.
USPC ............................................. 382/232

(58) Field of Classification Search
USPC ......... 382/232, 233, 240, 244–246, 250, 251; 375/216, 240.01, 240.11, E7.046, 375/E7.047, E7.051; 348/187, 472, 348/E17.001
See application file for complete search history.

(56) References Cited

U.S. PATENT DOCUMENTS

| | | | |
|---|---|---|---|
| 4,490,806 A | 12/1984 | Enke et al. | |
| 5,214,502 A * | 5/1993 | Stone et al. | 348/472 |
| 5,231,487 A * | 7/1993 | Hurley et al. | 375/240.01 |
| 5,768,534 A | 6/1998 | Guillotel et al. | |
| 5,995,989 A | 11/1999 | Gedcke et al. | |
| 7,217,747 B2 | 5/2007 | Weier et al. | |
| 7,283,231 B2 | 10/2007 | Brady et al. | |
| 7,289,049 B1 | 10/2007 | Fudge et al. | |
| 2003/0231625 A1 | 12/2003 | Calvignac et al. | |
| 2005/0215279 A1 | 9/2005 | Shim et al. | |
| 2006/0239336 A1* | 10/2006 | Baraniuk et al. | 375/216 |
| 2009/0196513 A1* | 8/2009 | Tian et al. | 382/232 |
| 2010/0315513 A1* | 12/2010 | Goodman et al. | 348/187 |

FOREIGN PATENT DOCUMENTS

| | | |
|---|---|---|
| CN | 1155788 A | 7/1997 |
| CN | 1448892 A | 10/2003 |
| CN | 1930798 A | 3/2007 |
| CN | 101043440 A | 9/2007 |

OTHER PUBLICATIONS

Foreign communication from a related counterpart application—International Search Report and Written Opinion, PCT/CN2009/070306, Apr. 30, 2009, 9 pages.

(Continued)

*Primary Examiner* — Amir Alavi
(74) *Attorney, Agent, or Firm* — Conley Rose, P.C.; Grant Rodolph; Clint Wilkins (57) ABSTRACT

An apparatus comprising a decorrelator, a compressive sampler coupled to the decorrelator, and an encoder coupled to the compressive sampler, wherein the compressive sampler is configured to receive sparse data and compress the sparse data using compressive sampling. Also included is a network component comprising at least one processor configured to implement a method comprising decorrelating sparse data or data including sparse data, compressing the sparse data using compressive sampling, and encoding the data. Also included is a method comprising receiving a data stream comprising a sparse data portion, compressing the sparse data portion using compressive sampling, and compressing the remaining data portion without using compressive sampling.

19 Claims, 5 Drawing Sheets

(56) References Cited

OTHER PUBLICATIONS

Baraniuk, Richard G., "Compressive Sensing," IEEE Signal Processing Magazine, Jul. 2007, 4 pages.
Candes, Emamnuel, et al., "Robust Uncertainty Principles: Exact Signal Reconstruction from Highly Incomplete Frequency Information," Jun. 2004, Revised Aug. 2005, pp. 1-41.
Candes, Emmanuel, "Compressive Sampling," Proceedings of the International Congress of Mathematicians, Madrid Spain, 2006, pp. 1-20.
Donoho, David L., "Compressed Sensing," Department of Statistics, Stanford University, Sep. 14, 2004, pp. 1-34.
Maleh, R., "Sparse Gradient Image Reconstruction Done Faster," Department of Mathematics, University of Michigan, Ann Arbor MI, 48109, 4 pages, 2006.
Foreign Communication From a Related Counterpart Application, PCT Application PCT/CN2009/070359, International Search Report dated Apr. 30, 2009, 6 pages.
Foreign Communication From a Related Counterpart Application, PCT Application PCT/CN2009/070359, Written Opinion dated Apr. 30, 2009, 4 pages.
"General Aspects of Digital Transmission Systems, Terminal Equipments, Pulse Code Modulation (PCM) of Voice Frequencies," ITU-T G. 711, 1993, 12 pages.
"Series G: Transmission Systems and Media, Digital Systems and Networks, Digital Transmission Systems-Terminal Equipments-Coding of Analogue Signals by Pulse Code Modulation, Pulse Code modulation (PCM) of Voice Frequencies, Appendix 1: A High Quality Low-Complexity Algorithm for Packet Loss Concealment with G 7.11," ITU-T.G.711 Appendix I, Sep. 1999, 26 pages.
"Series G: Transmission Systems and Media, Digital Systems and Networks, Digital Transmission Systems-Terminal Equipments-Coding of Analogue Signals by Pulse Code Modulation, Pulse Code Modulation (PCM) of Voice Frequencies, Appendix II: A Comfort Noise Payload Definition for ITU-T G.711 Use in Packet-Based Multimedia Communication Systems," ITU-T G. 711 Appendix II, Feb. 2000, 18 pages.
"Series G: Transmission Systems and Media, Digital Systems and Networks, Digital Terminal Equipments-Coding of Voice and Audio Signals, Frame Error Robust Narrow-Band and Wideband Embedded Variable Bit-Rate Coding of Speech and Audio from 8-32 kbit/s," ITU-T G. 718, Jun. 2008, 257 pages.
"Series G: Transmission Systems and Media, Digital Systems and Networks, Digital Terminal Equipments-Coding of Analogue Signals by Methods Other Than PCM, Dual Rate Speech Coder for Multimedia Communications Transmitting at 5.3 and 6.3 kbit/s," ITU-T G. 723.1, May 2006, 64 pages.
"General Aspects of Digital Transmission Systems; Terminal Equipments, Coding of Speech at 16 kbits Using Low-Delay Code Excited Linear Prediction," ITU-T G.728, Sep. 1992, 65 pages.
"General Aspects of Digital Transmission Systems, Coding of Speech at 16 kbit/s Using Low-Delay Code Excited Linear Prediction, Annex G: 16 kbit/s Fixed Point Specification," ITU-T G. 728 Annex G, Nov. 1994, 68 pages.
"Series G: Transmission Systems and Media, Digital Systems and Networks, Digital Transmission Systems-Terminal Equipments-Coding of Analogue Signals by Methods Other than PCM, Programs and Test Sequences for Implementation Verification of the Algorithm of the G.728 16 kbit/s LD-CELP Speech Coder," ITU-T G.728 Appendix I Verification Tools, Jul. 1995, 16 pages.
"General Aspects of Digital Transmission Systems, Speech Performance," ITU-T G.728 Appendix II, Nov. 1995, 7 pages.
"Series G: Transmission Systems and Media, Digital Systems and Networks, Digital Transmission Systems-Terminal Equipments-Coding of Analogue Signals by Methods Other than PCM, Coding of Speech at 16 kbit/s Using Low-Delay Code Excited Linear Prediction, Annex H: Variable Bit Rate LD-CELP Operation Mainly for DCME at Rates Less Than 16 kbit/s," ITU-T G. 728 Annex H, Jul. 1997, 19 pages.
"Series G: Transmission Systems and Media, Digital Systems and Networks, Digital Transmission Systems-Terminal Equipments-Coding of Analogue Signals by Methods Other than PCM, Coding of Speech at 16 kbit/s Using Low-Delay Code Excited Linear Prediction, Annex H: Variable Bit Rate LD-CELP Operation Mainly for DCME at Rates Less than 16 kbit/s," ITU-T G. 728 Annex H, May 1999, 20 pages.
"Series G: Transmission Systems and Media, Digital Systems and Networks, Digital Transmission Systems-Terminal Equipments-Coding of Analogue Signals by Methods Other than PCMm, Coding of Speech at 16 kbit/s Using Low-Delay Code Excited Linear Prediction,Annex I: Frame or Packet Loss Concealment for the LD-CELP Decoder," ITU-T G. 728 Annex I, May 1999, 26 pages.
"Series G: Transmission Systems and Media, Digital Systems and Networks, Digital Transmission Systems-Terminal Equipments-Coding of Analogue Signals by Methods Other than PCM, Coding of Speech at 16kbit/s Using Low-Delay Code Excited Linear Prediction, Annex J: Variable Bit-Rate Operation of LD_CELP Mainly for Voiceband-Date Applications in DCME," ITU-T G. 728 Annex J, Sep. 1999, 41 pages.
"Series G: Transmission Systems and Media, Digital Systems and Networks, Digital Transmission Systems-Terminal Equipments-Coding of Analogue Signals by Methods Other than PCM, Coding of Speech at 16 kbit/s Using Low-Delay Code Excited Linear Prediction, Annex G: 16 kbit/s Fixed Point Specification Corrigendum 1," ITU-T G.728 Annex G Corrigendum 1, Feb. 2000, 12 pages.
"Series G: Transmission Systems and Media, Digital Systems and Networks, Digital Terminal Equipments-Coding of Analogue Signals by Methods Other than PCM, Coding of Speech at 16 kbit/s Using Low-Delay Code Excited Linear Prediction, Amendment 1: Revised Annex J—Variable Bit-Rate Operation of LD-CELP Mainly for Voiceband Data Applications in DCME," ITU-T G. 728 Amendment 1, May 2006, 12 pages.
"Series G: Transmission Systems and Media, Digital Systems and Networks, Digital Terminal Equipments-Coding of Analogue Signals by Methods Other than PCM, Coding of Speech at 8 kbit/s Using Conjugate-Structure AlgebraicCode-Excited Linear Prediction (CS-ACELP)," ITU-T G. 729, Jan. 2007, 146 pages.
"Series H: Audiovisual and Multimedia Systems, infrastructure of Audiovisual Services-Coding of Moving Video, Video Coding for Low Bit Rate Communication," ITU-T H.263, Jan. 2005, 226 pages.
"Series H: Audiovisual and Multimedia Systems, Infrastructure of Audiovisual Services-Coding of Moving Video, Advanced Video Coding for Generic Audiovisual Services," ITU-T H. 264, Jan. 2012, 668 pages.

* cited by examiner

COMPRESSIVE SAMPLING FOR MULTIMEDIA CODING

CROSS-REFERENCE TO RELATED APPLICATIONS

The present application claims priority to U.S. Provisional Patent Application 61/026,189 filed Feb. 5, 2008 by Jun Tian et al. and entitled "System and Method for Compressive Sampling for Multimedia Coding," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In data communications and data storage, the amount of data can be reduced using compression schemes or algorithms. The compression schemes encode the data using fewer data values or units without losing substantial information. As such, the data can be stored or transported with reduced storage, bandwidth, or other resources. Some compression schemes are lossless techniques, in that the redundancies in the data are reduced or eliminated without losing any information in the data. Other compression schemes are lossy techniques, in that the quantities of data values are reduced with some loss of information, which may be acceptable or tolerated. The compressed data can be decompressed using decompression schemes that correspond to the applied compression schemes.

Different compression schemes can be applied to different types of digital data, including text, image, audio, video, or other types of communicated or stored data. For example, compression schemes for text data include the ZIP and RAR file formats. Compression schemes for image data include Joint Photographic Experts Group (JPEG) and JPEG 2000 standards. Compression schemes for video data include different Moving Picture Experts Group (MPEG) standards, such as MPEG-1, MPEG-2, MPEG-4, and MPEG-4 Part 10 for Advanced Video Coding (AVC) and International Telecommunication Union Telecommunication Standard Sector (ITU-T) Video Coding Expert Group (VCEG) standards, such as H.263 and H.264. Compression schemes for audio data include Moving Picture Experts Group (MPEG) standards, such as MPEG-1 Audio Layer 3 (MP3), Advanced Audio Coding (AAC), High Efficiency-AAC (HE-AAC) or AACplus, enhanced AACplus, and low delay AAC (LD-AAC), International Telecommunication Union Telecommunication Standard Sector video and audio Standards, such as G.711, G.718, G.723, G.728, G.729, etc., and The $3^{rd}$ Generation Partnership Project (3GPP) audio codec standards, such as AMR, AMR-WB, Audio Video Standard (AVS), hardware video compressor (HVC), 3D MPEG surround, unified speech and audio coding (USAC), etc. Other widely adopted but nonstandard audio, video, and image codec, such as Microsoft Windows Media codec, etc, may also be applied.

SUMMARY

In one embodiment, the disclosure includes an apparatus comprising a decorrelator, a compressive sampler coupled to the decorrelator, and an encoder coupled to the compressive sampler, wherein the compressive sampler is configured to receive sparse data and compress the sparse data using compressive sampling.

In another embodiment, the disclosure includes a network component comprising at least one processor configured to implement a method comprising decorrelating sparse data or data including sparse data, compressing the sparse data using compressive sampling, and encoding the data.

In yet another embodiment, the disclosure includes a method comprising receiving a data stream comprising a sparse data portion, compressing the sparse data portion using compressive sampling, and compressing the remaining data portion without using compressive sampling.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Most data compression techniques generally comprise three steps: decorrelation transformation, quantization, and entropy coding. Decorrelation transformation refers to the process of reducing repeated or periodical data patterns or similarities between data patterns. Quantization refers to the process of substituting a continuous range of data values or a relatively large set of discrete values by a smaller set of discrete symbols or integer values. Entropy coding refers to the process of encoding data in a lossless manner, e.g. without losing any information. Although generally completed in the order described, these steps may be completed in any order.

According to the Shannon sampling theory, a data signal with limited signal bandwidth may be reconstructed or decompressed without loss of information when the sampling rate used for compressing the data is greater than twice the highest bandwidth frequency, also referred to as the Nyquist rate. If the data is compressed using a sampling rate smaller than twice the highest bandwidth frequency, e.g., with fewer samples or values, the reconstructed data will lack some information or contain some error, and the data signal is said to be aliased. However, a recent compressive sampling theory shows that if the data comprises a sparse portion, which may be substantially represented by a plurality of values equal to zero or substantially smaller than the remaining values, the data signal may still be reconstructed using a smaller number of values than the number of the Nyquist rate samples with substantially no loss of information. Many data types, such as audio, image, and video, may comprise sparse data portions, and hence compressive sampling may be suitable to compress such data. Compressive sampling may also be referred to as compressive sensing, compressed sensing, or sparse sampling.

Disclosed herein is a system and method for compressing data using compressive sampling with substantially no loss of information. Specifically, the data may comprise at least one sparse portion, which may be compressed using compressive sampling, e.g. using a subset of the vales in the data, which may be selected randomly. The remaining portions of the data may be compressed in a conventional manner without compressive sampling. In one embodiment, a conventional data compression scheme may be modified and used for sparse data, where the quantization process may be replaced by compressive sampling after the decorrelation transformation and before entropy coding. In another embodiment, the quantization process may be combined with or modified to include compressive sampling to compress sparse and non-sparse data. In yet another embodiment, a new data compression scheme based on compressive sampling may be used for sparse data or data including sparse data portions. The proposed compressive sampling based procedures may provide significantly reduced representations for digital data, and hence reduce storage cost, communication bandwidth, or other processing resources.

Figure 1:
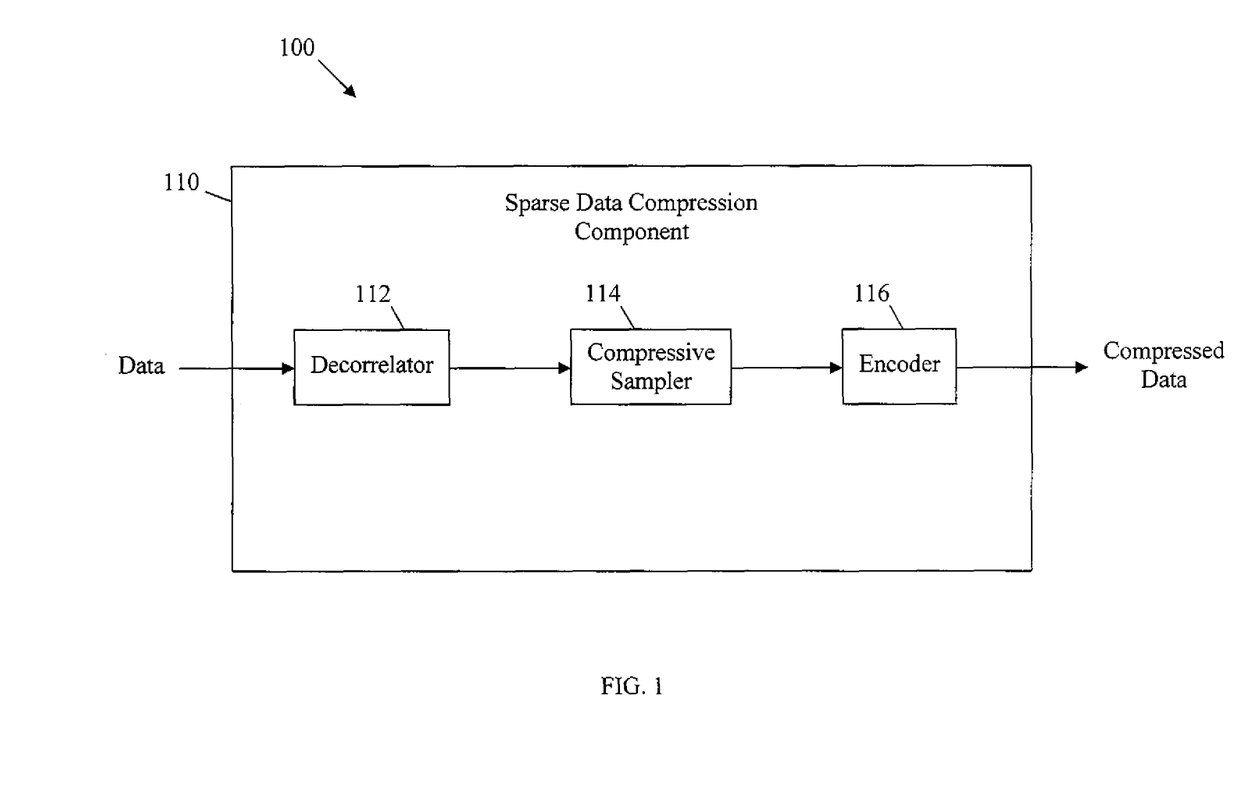
FIG. 1 is a schematic diagram of an embodiment of a compressive sampling data compression system.

FIG. 1 illustrates one embodiment of a data compression system 100 that uses compressive sampling. The data compression system 100 may be based on a standard data compression scheme, such as JPEG for image compression, MP3 for audio compression, or MPEG for video compression. The data compression system 100 may comprise a sparse data compression component 110, which may be configured to implement a compressive sampling based compression for sparse data. The data compression component 110 may comprise a decorrelator 112, a compressive sampler 114, and an encoder 116.

The decorrelator 112 may be configured to receive sparse data and reduce any redundancies or similarities in the data. The data may comprise at least one signal, a bit stream, a plurality of real or integer values, a vector or list of values, or other data types that may be represented in an array or string format or a matrix format. The decorrelation transformation 112 may be used to reduce autocorrelation or cross-correlation within the data and preserve other aspects of the signal. In an embodiment, the decorrelator 112 may use a linear transformation or a filter, such as a Karhunen-Loève transform or a discrete cosine transform, to reduce the autocorrelation of a signal. Additionally, the decorrelator 112 may use other filters or transform functions to reduce the error or noise in the data.

The compressive sampler 114 may be configured to receive the decorrelated sparse data from the decorrelator 112 and apply compressive sampling to the data. The sparse data may be substantially represented by a plurality of values equal to about zero or substantially smaller than the remaining values. According to compressive sampling theory, a random subset of global measurements of the sparse data may be used to reconstruct the sparse data with substantially no loss of information. In some embodiments, the sparse data may be represented in some transform domain (e.g., time domain, frequency domain, etc.) using some significant coefficients and substantially more remaining coefficients, where significance means large magnitude. The significant coefficients may contribute most of the information or more information than the remaining coefficients. The remaining coefficients may be substantially smaller than the significant coefficients or equal to about zero. A random subset of compressive measurements may be used to reconstruct the sparse data with substantially no loss of information.

The sparse data may be processed using compressive sampling without using a quantization process, e.g., without replacing the actual data values with a limited set of discrete values. In some embodiments, the sparse data may be further processed, for instance using motion estimation or compensation in the case of video data, perceptual modeling, or both. The sparse data may be compressed using a compressive sampling matrix, which may satisfy a uniform uncertainty principle (UUP). Accordingly, the compressive sampling matrix may conform to a restricted isometry condition, where at least a subset of the columns of the compressive sampling matrix may be about orthonormal. The subset may comprise a number of columns proportional to the cardinality, S, of the data vector, e.g., the number of non-zero values in the data. Alternatively, the columns of the compressive sampling matrix may be about orthogonal.

Further, the compressive sampling matrix may comprise a total number of columns, N, equal to the total number of values in the data vector, and a total number of rows, K, which may be greater than about S and less than about N. The total number of rows, K, may also be proportional to S, N, or both. In an embodiment, the total number of rows K may be substantially smaller than about N. For example, if a data bit stream comprises about 10,000 bits, the number of rows K may be equal to about 300 and the number of columns, N, may be equal to about 1,000. In some embodiments, the compressive sampling process may be improved when K is greater than a product of C, S, and log(N), and S is less than or equal to about a product of C and K divided by log(N/K), where C is a constant, such as a positive integer.

In an embodiment, the compressive sampling matrix may comprise more zero values than non-zero values, which may be generated randomly based on some random distribution or on some transform, such as Fourier coefficients. In such a case, the compressive sampling matrix is said to be sparse. For instance, each row or column may comprise about one non-zero value and a plurality of remaining zero values. In other embodiments, the compressive sampling matrix may comprise more non-zero values than zero values and the matrix is said to be dense. The compressive sampling matrix may be multiplied by the data vector to obtain a compressive sampling data vector, which may comprise a smaller number of values that represent compressed data. The smaller number of values, e.g., compressed sparse data, may then be used to retrieve the sparse data in a reverse manner. For instance, the compressive sampling data vector may be processed using the same compressive sampling matrix to retrieve the data vector representing the sparse data.

The encoder 116 may be configured to receive the compressed sparse data from the compressive sampler 114. The received data may be encoded using entropy coding. For instance, a unique prefix code may be assigned to each data value or symbol. The encoder 116 may replace the data values, which may have fixed sizes or lengths, with the assigned prefix codes, which may have variable lengths. The lengths of the prefix codes may be about proportional to the negative logarithm of the probability of occurrence of the data symbol.

As such, the most occurring data symbols may be substituted with the shortest prefix codes. The data may be encoded using different entropy coding techniques, including Huffman coding and arithmetic coding. In some embodiments, if the approximate entropy characteristics of the data are known in advance, a simpler static code may be used, including universal codes, such as Elias gamma coding or Fibonacci coding, and Golomb codes, such as Unary coding or Rice coding.

Figure 2:
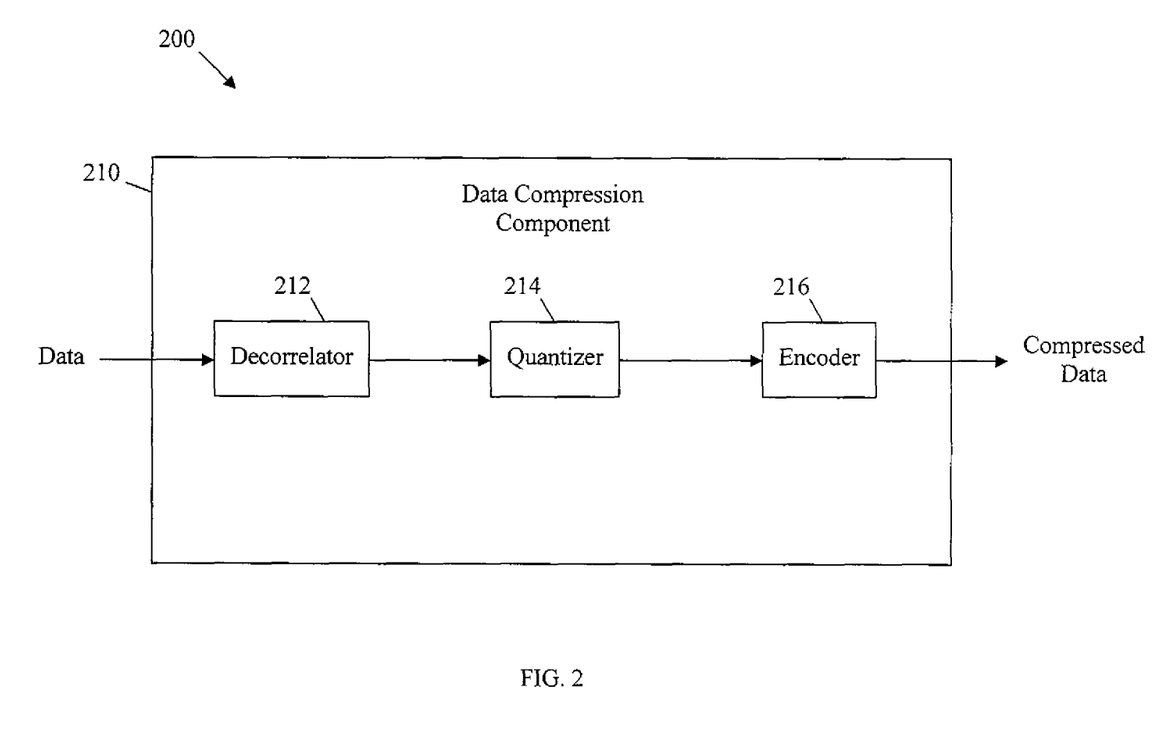
FIG. 2 is a schematic diagram of another embodiment of a compressive sampling data compression system.

FIG. 2 illustrates an embodiment of another data compression system 200, which may be used to compress data including sparse data portions based on a combination of standard data compression and compressive sampling. The data compression system 200 may comprise a data compression component 210, which may be configured for compressive sampling. The data compression component 210 may comprise a decorrelator 212, a quantizer 214, and an encoder 216. The data compression component 210 and the encoder 216 may be configured to process the data substantially similar to the decorrelator 112 and the encoder 116, respectively.

The quantizer 214 may be configured to receive the data from the decorrelator 212 and compress the data using a combination of quantization and compressive sampling. The portions of the data, which may not comprise sparse data, may be compressed in a conventional manner based on some quantization scheme. For example, in the case of JPEG image data, the image data may be quantized by reducing the number of data bits, which may also reduce the resulting image quality. The quantization process may represent the JPEG image data with acceptable quality using less than or about three bits per pixel instead of about 24 or more bits per pixel in the original image.

Additionally, the quantizer 214 may process the sparse data portions of the data using compressive sampling. As such, the quantizer 214 may detect the sparse data portions, for instance by using some domain transformation and checking the resulting transform coefficients. The detected sparse data may then be processed using compressive sampling, as described above. In an embodiment, the sparse data portions may be detected and compressed using compressive sampling before the quantization process. Accordingly, the compressed sparse data may be combined with the remaining data and then quantized. Alternatively, the entire data may be quantized and then the sparse data portions may be detected and further compressed using compressive sampling. The resulting combined quantized and compressed data may then be sent for encoding to the encoder 216.

Figure 3:
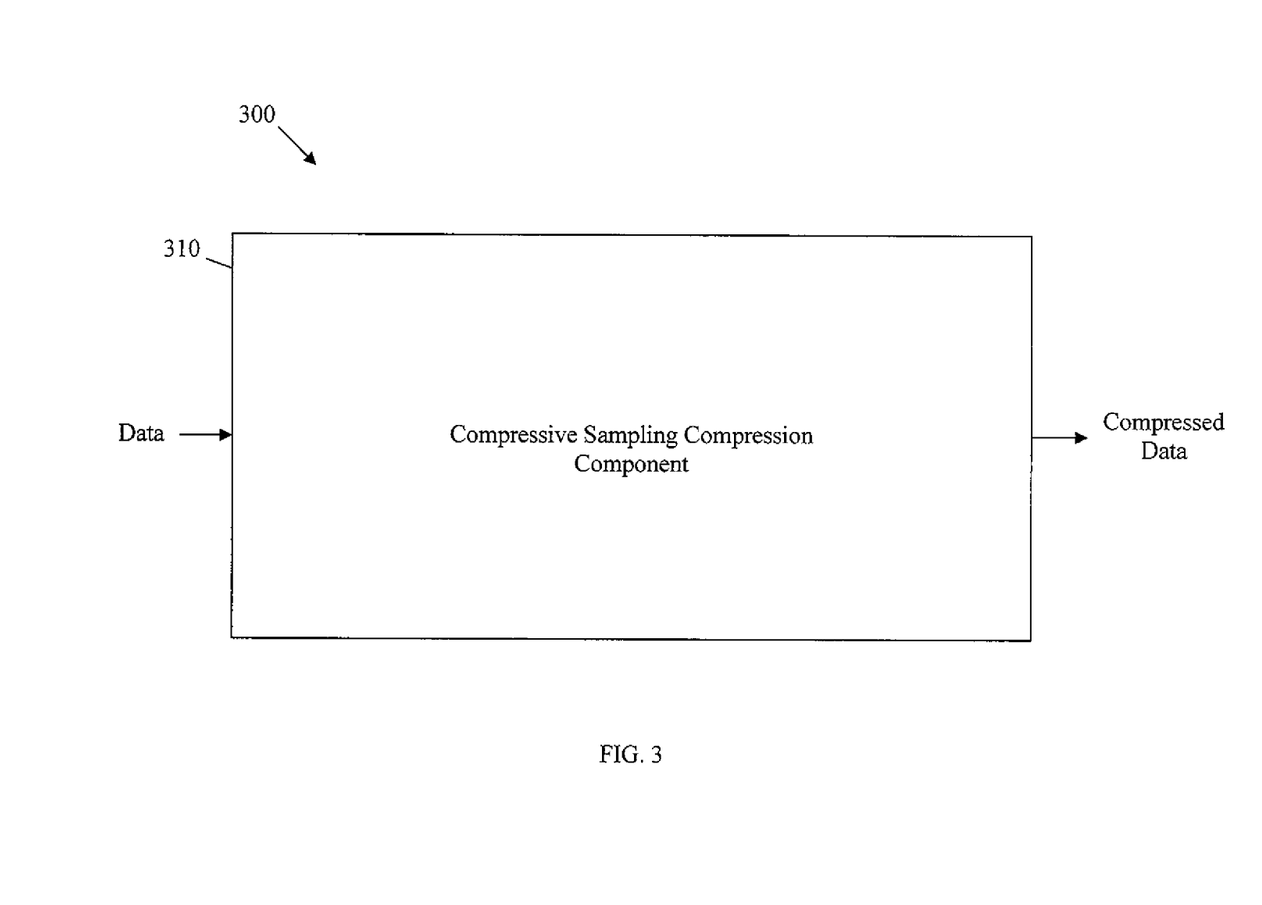
FIG. 3 is a schematic diagram of another embodiment of a compressive sampling data compression system.

FIG. 3 illustrates an embodiment of an alternative data compression system 300, which may be based on compressive sampling and used to compress sparse data or data including sparse data portions. The data compression system 300 may not be based on conventional or standard data compression schemes. In one embodiment, the data compression system may comprise a compressive sampling compression component 310, which may be configured to compress sparse data. The sparse data may be compressed using a compressive sampling matrix, which may be modified for additional decorrelation of the sparse data, without quantization. The compressed sparse data may also be coded using entropy coding. In another embodiment, the compressive sampling compression component 310 may be configured to compress data including sparse data portions, where a compressive sampling matrix combined with a decorrelation matrix may be used to compress the sparse data and a quantization process may be used to compress the non-sparse data.

The compressive sampling compression component 310 may use transforms, filters, functions, or combinations thereof to optimize compressive sampling of the sparse data. For instance, the compressive sampling compression component 310 may use a modified discrete cosine transform (mDCT), a discrete cosine transform (DCT), a fast Fourier transform (FFT), or a discrete wavelet transform (DWT) to obtain quantized coefficients for compressing the sparse data. The compressive sampling process may be optimized in an iterative procedure to improve the transform coefficients, the geometric moment, or other features of the transform. The optimized compressive sampling information, including the optimized compressive sampling matrix, the quantized coefficients, or other features of the transform, may be needed to retrieve the original data form the compressed data.

In some embodiments, the data compression systems above may be used in conjunction with data decompression systems, which may be configured to decompress the compressed data in a reversed manner. As such, the data decompression systems may comprise decoders, which may be configured to implement entropy decoding, for instance by replacing the prefix codes with the corresponding data values or symbols. Additionally, the data decompression systems may implement decompressed sampling, where the decoded values may be processed to obtain the decompressed data. The decoded values may comprise the compressed sparse data, which may be decompressed using a reversed compressed sampling procedure and the same compressed sampling matrix. Different optimization or solution methods may be used to decompress the compressed sparse data, including l1-minimization, orthogonal matching pursuit (OMP), or regularized OMP (ROMP). The decoded values may also comprise the remaining compressed non-sparse data, which may be decompressed using a reverse quantization process.

Figure 4:
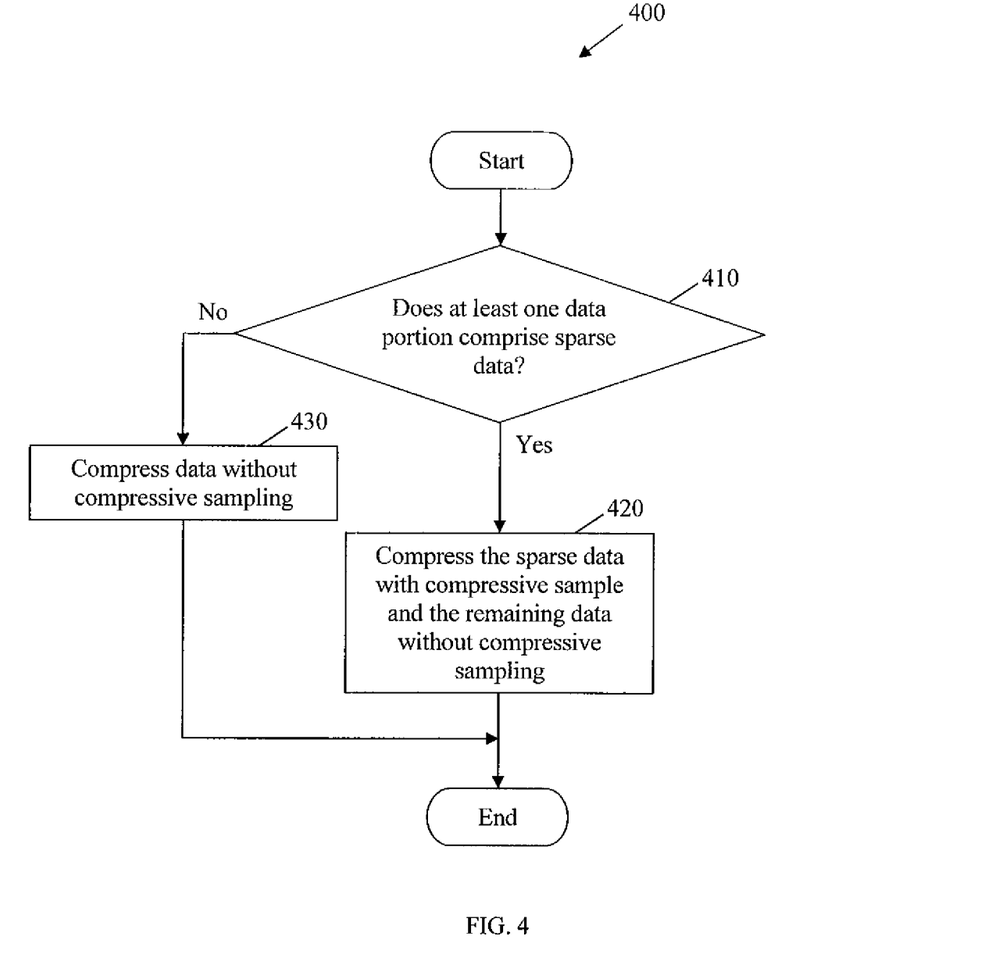
FIG. 4 is a flowchart of an embodiment of a data compression method.

FIG. 4 illustrates an embodiment of a data compression method 400, which may be used to compress data, including sparse data portions. The data compression method 400 may start at block 410, where the data compression method 400 may verify whether the data comprises at least one sparse data portion. For example, the sparse data portions may be detected by analyzing the individual values in the data with respect to each other or analyzing some transform coefficients that are associated with the data in some transform domain. The data compression method 400 may proceed to block 420 if the at least one sparse data portion is detected; otherwise the data compression method 400 may proceed to block 430.

At block 420, the data compression method 400 may use compressive sampling based compression to compress the sparse data and standard compression techniques without compressive sampling to compress the remaining data. In the case of compressive sampling, the data compression method 400 may use a compressive sampling matrix, such as a Gaussian matrix, a binary matrix, a Fourier matrix, or an incoherent matrix. The rows of the Gaussian matrix may comprise random values, which may be generated based on a normal distribution with zero mean and a variance equal to about the inverse of the number or rows of the matrix. The rows of the binary matrix may comprise random values, which may be generated based on a symmetric Bernoulli distribution. The rows of the Fourier matrix may comprise Fourier coefficients, which may be randomly selected from the Fourier coefficients corresponding to the data and renormalized. The rows of the incoherent matrix may comprise values, which may be randomly selected from an orthonormal matrix corresponding to the data and renormalized.

In an example, an image data may be represented using a data matrix comprising about 512 rows and about 512 columns. The image data may be further processed using a wavelet transform to obtain a plurality of frequency image data components. The three highest frequency image data components, HL1, LH1, and HH1, may each be represented by a frequency component matrix comprising about 256 rows and about 256 columns. The frequency component matrices may be sparse matrices, e.g., comprise substantially zero values and relatively few non-zero values, and hence may be compressed using compressive sampling. A different compressive sampling matrix may be optimized and used for each of the three frequency component matrices or the same compressive sampling matrix may be optimized and used for the three frequency component matrices. Each of the frequency component matrices may be rearranged into a frequency component column vector comprising all the values in the matrix, which may be about 65,536 (256×256) values. As such, the compressive sampling matrix may comprise about 256 rows and about 65,536 columns and may be multiplied with the corresponding frequency component column vector to obtain a compressed data column vector comprising about 256 values that represent about 65,536 original values. As such, the total number of values for each of the three highest frequency image data components, HL1, LH1, and HH1, may be reduced from about 65,536 to about 256, and the total number of values in all three may be reduced from about 196,608 to about 768. The original values may then be recovered from each compressed data column vector using the inverse or pseudo-inverse of the corresponding compressive sampling matrix.

At block 430, the data compression method 400 may use standard compression techniques, including quantization to compress the non-sparse data. The data compression method 400 may end after processing all the data at block 420 or block 430.

Figure 5:
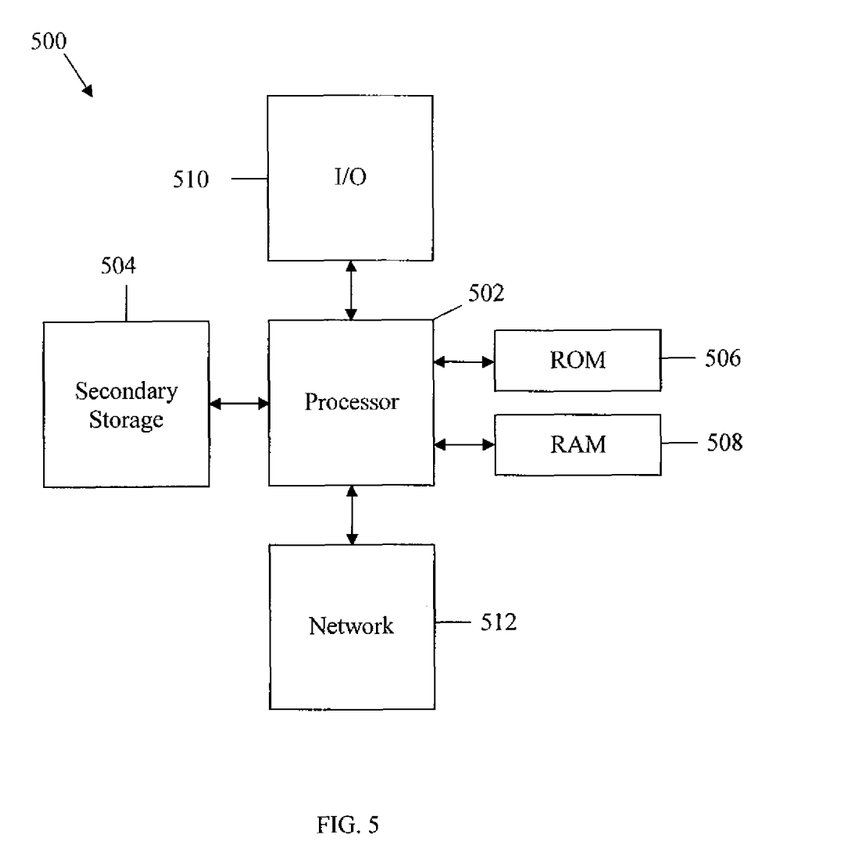
FIG. 5 is a schematic diagram of an embodiment of a general-purpose computer system.

The components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a nonvolatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a decorrelator;
a compressive sampler coupled to the decorrelator; and
an encoder coupled to the compressive sampler,
wherein the compressive sampler is configured to receive sparse data and compress the sparse data using compressive sampling.

2. The apparatus of claim 1, wherein the sparse data is compressed without substantially any loss of information.

3. The apparatus of claim 1, wherein the sparse data is compressed without quantization.

4. The apparatus of claim 1, wherein the sparse data comprises a plurality of zero values or values substantially smaller than the remaining values.

5. The apparatus of claim 1, wherein the compressed sparse data comprises values that are related to a random subset of values in the data.

6. The apparatus of claim 1, wherein the sparse data is represented in a transform domain using a plurality of significant coefficients and a plurality of remaining coefficients, wherein the significant coefficients contribute more information than the remaining coefficients, wherein there are substantially more remaining coefficients than significant coefficients, and wherein the remaining coefficients are substantially smaller than the significant coefficients or equal to about zero.

7. The apparatus of claim 6, wherein the compressed sparse data comprises values that are related to a random subset of the significant coefficients and remaining coefficients.

8. The apparatus of claim 1, wherein the sparse data is image data, video data, audio data, 3D image/video data, graphic data, hybrid media data, or rich media data.

9. The apparatus of claim 1, wherein the compressed sparse data is stored or communicated over a network.

10. A network component comprising:
at least one processor configured to:
decorrelate sparse data or data including sparse data;
compress the sparse data using compressive sampling; and
encode the data,
wherein the data is decorrelated; quantized, and encoded based on Joint Photographic Experts Groin (JPEG) standards, Moving Picture Experts Group (MPEG)-1, MPEG-2, MPEG-4, and MPEG-4 Advanced Video Coding (AVC), MPEG-1 Audio Layer 3 (MP3), Advanced Audio Coding (AAC), High Efficiency-AAC (HE-AAC), enhanced AAC plus (eAAC+), low delay AAC (LD-AAC), International Telecommunication Union Telecommunication Standard Sector (ITU-T) video standards, ITU-T audio standards, Audio Video Standard (AVS), The $3^{rd}$ Generation Partnership Project (3GPP) audio codec standards, hardware video compressor (HVC), 3D MPEG surround, unified speech and audio coding(USAC), or combinations thereof.

11. The network component for claim 10, wherein the at least one processor is further configured to quantize the decorrelated data.

12. The network component of claim 10, wherein the sparse data is compressed using a compressive sampling matrix comprising a plurality of non-zero values obtained randomly based on a random distribution or a transform and a plurality of zero values, and wherein the number of rows of the compressive sampling matrix is substantially smaller than the number of columns of the compressive sampling matrix.

13. The network component of claim 12, wherein the random values of the compressive sampling matrix are generated based on a Gaussian distribution or a Fourier transform.

14. The network component of claim 12, wherein the compressed sparse data is equal to about the product of the compressive sampling matrix and a vector comprising the sparse data values, wherein the number of compressed data values is equal to the number of rows of the compressive sampling matrix, and wherein the number of sparse data values is equal to the number of columns of the compressive sampling matrix.

15. The network component of claim 12, wherein the sparse data is recovered using the compressed sparse data values and the compressive sampling matrix.

16. A network component comprising:
at least one processor configured to:
decorrelate sparse data or data including sparse data;
compress the sparse data using compressive sampling; and
encode the data,
wherein the sparse data is compressed using a compressive sampling matrix comprising a plurality of non-zero values obtained randomly based on a random distribution or a transform and a plurality of zero values, and wherein the number of rows of the compressive sampling matrix is substantially smaller than the number of columns of the compressive sampling matrix.

17. The network component of claim 16, wherein the random values of the compressive sampling matrix are generated based on a Gaussian distribution or a Fourier transform.

18. The network component of claim 16, wherein the compressed sparse data is equal to about the product of the compressive sampling matrix and a vector comprising the sparse data values, wherein the number of compressed data values is equal to the number of rows of the compressive sampling matrix, and wherein the number of sparse data values is equal to the number of columns of the compressive sampling matrix.

19. The network component of claim 16, wherein the sparse data is recovered using the compressed sparse data values and the compressive sampling matrix.

* * * * *